(12) United States Patent
Grotendorst

(10) Patent No.: US 9,631,433 B2
(45) Date of Patent: Apr. 25, 2017

(54) METHOD AND APPARATUS FOR INTRODUCING OR SINKING CAVITIES IN ROCK

(71) Applicant: Josef Grotendorst, Dorsten (DE)

(72) Inventor: Josef Grotendorst, Dorsten (DE)

(*) Notice: Subject to any disclaimer, the term of this patent is extended or adjusted under 35 U.S.C. 154(b) by 72 days.

(21) Appl. No.: 14/381,765

(22) PCT Filed: Mar. 15, 2013

(86) PCT No.: PCT/EP2013/000800
§ 371 (c)(1),
(2) Date: Aug. 28, 2014

(87) PCT Pub. No.: WO2013/135391
PCT Pub. Date: Sep. 19, 2013

(65) Prior Publication Data
US 2015/0042145 A1    Feb. 12, 2015

(30) Foreign Application Priority Data
Mar. 15, 2012   (DE) .......................... 10 2012 005 044

(51) Int. Cl.
| | | |
|---|---|---|
| E21B 7/15 | (2006.01) |
| E21D 1/00 | (2006.01) |
| E21D 9/10 | (2006.01) |
| E21D 13/00 | (2006.01) |
| B23K 10/00 | (2006.01) |

(Continued)

(52) U.S. Cl.
CPC ............... *E21B 7/15* (2013.01); *B23K 10/00* (2013.01); *E21D 1/00* (2013.01); *E21D 9/1073* (2013.01); *E21D 13/00* (2013.01); *B23K 2203/50* (2015.10); *E21C 37/16* (2013.01)

(58) Field of Classification Search
CPC ... E21D 1/00; E21D 1/03; E21C 37/16; E21B 43/285
USPC ............................................... 175/12
See application file for complete search history.

(56) References Cited

U.S. PATENT DOCUMENTS

| | | | |
|---|---|---|---|
| 3,467,206 A | | 9/1969 | Acheson et al. |
| 3,788,703 A | * | 1/1974 | Thorpe ................... E21C 37/18 |
| | | | 175/16 |
| 7,784,563 B2 | | 8/2010 | Rödland et al. |

(Continued)

OTHER PUBLICATIONS

International Search Report of PCT/EP2013/000800, mailed May 21, 2014.

*Primary Examiner* — David Bagnell
*Assistant Examiner* — Michael Goodwin
(74) *Attorney, Agent, or Firm* — Collard & Roe, P.C.

(57) ABSTRACT

The invention relates to a method for sinking or introducing cavities in rock, wherein the face of the cavity (2) is melted using electrical plasma generators. In order in such a method to produce an energy density at the face of the cavity (2), the energy density being sufficient to completely or partially evaporate the in-situ stone, the invention proposes arranging a heat shield (4) immediately over the face of the cavity (2), the heat shield (4) forming with the face of the cavity (2) a dynamic pressure space (7) in which a temperature of more than 2000° C. is established at a pressure of more than 2 bar by heating with plasma generators (8). This supply of energy is sufficient to melt the stone in-situ at the face of the cavity (2), to completely or partially gasify it and to remove it from the cavity (2).

8 Claims, 6 Drawing Sheets

Figure 1:
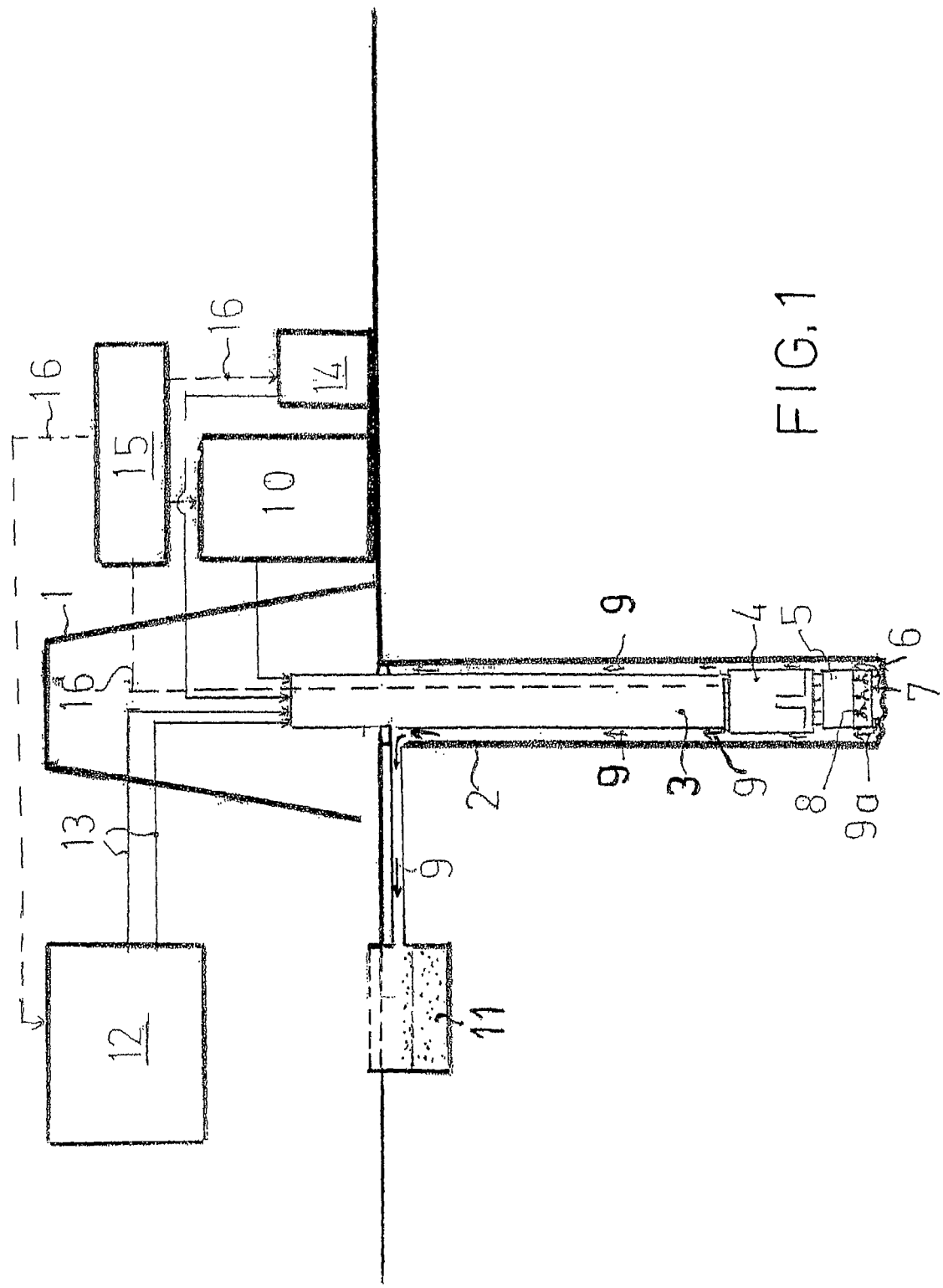

(51) Int. Cl.
 *E21C 37/16* (2006.01)
 *B23K 103/00* (2006.01)

(56) References Cited

U.S. PATENT DOCUMENTS

2011/0120771 A1    5/2011  Montaron
2014/0056646 A1*   2/2014  Aulisio .................. E21C 37/16
                                                    405/129.2

* cited by examiner

METHOD AND APPARATUS FOR INTRODUCING OR SINKING CAVITIES IN ROCK

CROSS REFERENCE TO RELATED APPLICATIONS

This application is the National Stage of PCT/EP2013/000800 filed on Mar. 15, 2013, which claims priority under 35 U.S.C. §119 of German Application No. 10 2012 005 044.5 filed on Mar. 15, 2012, the disclosures of which are incorporated by reference. The international application under PCT article 21(2) was not published in English.

The invention relates to a method and to an apparatus for introducing or sinking cavities in rock, in which the bedrock situated at the face of the cavity is thermally melted and is conveyed out of the cavity using a gaseous conveying medium, wherein the heat required for melting the rock is provided by at least one electric plasma generator, which is assigned to an advancing head that is situated at the front in a supply device that can be pushed into the cavity. Here, all types of boreholes, bore shafts, shafts, galleries, tunnels, chambers, etc. are understood to be cavities in rock.

Such a method and the related apparatus are known from U.S. Pat. No. 3,467,206. In this method, known according to the state of the art, a holder for a plasma burner, which holder can be rotated about the axis of the cavity and is supported at the face of the cavity by means of rollers, is provided at the front of the advancing head, the plasma jet of which burner is directed at an angle against the face and the wall of the cavity and is supposed to successively melt the face of the cavity when the holder is rotated. The molten rock is supposed to be transported away by means of a gaseous conveying medium. For this purpose, a correspondingly strong stream of the gaseous conveying medium is directed against the face of the cavity. The supply to the advancing head of electric energy and the gaseous medium takes place here by way of a flexible cable, which is connected with the advancing head. To accelerate melting, here a suitable pulverized flow agent is also blown into the melt zone.

This previously known method and the related apparatus have not been able to establish themselves in practice, to the extent that this could be determined. Probably, it was not possible to generate the energy density required for melting the rock in the melt zone, which constantly comes into contact with large amounts of the conveying medium. A targeted increase in the energy density was countered, among other things, by the fact that parts that move by rotation are disposed in the region of the melt zone, such as, for example, the rotating support of the plasma burner, the support rollers, their bearings, etc.

It is the task of the invention to further develop the method and the apparatus of the type stated initially to the effect that a significantly higher energy density can be produced in the region of the melt zone, and that it is possible to do without rotating parts in the region of the melt zone.

To accomplish this task, the invention proposes, proceeding from the method of the type stated initially, that the advancing head has a heat shield at the front, which shield covers the face of the cavity except for a gap that remains at the periphery and forms a dynamic pressure space with the face of the cavity, that the dynamic pressure space situated between the heat shield and the face of the cavity is impacted by a partial stream of the gaseous conveying medium heated by the plasma generator, and that this partial stream of the gaseous conveying medium melts the bedrock situated at the face of the cavity, evaporates it in whole or in part, discharges it from the dynamic pressure space by way of the peripheral gap, and introduces it into the main stream of the gaseous conveying medium.

With the method according to the invention, it is possible, for the first time, to produce very great energy density (temperature and pressure) at the face of the cavity, which density is sufficient for melting the bedrock over the entire surface of the face of the cavity, without problems, and, additionally, to evaporate it, in whole or in part, in order to subsequently be able to transport it away using the gaseous conveying medium. It is particularly advantageous, in this connection, that no movable parts are required in the melt zone underneath the heat shield.

An advantageous embodiment of the method according to the invention provides that a dynamic pressure of more than 2 bar and a temperature of at least 2000° C., preferably of more than 2900° C., are set in the dynamic pressure space between the heat shield and the face of the cavity. The high temperatures guarantee rapid advancing progress. The pressure is set high enough so that it is sufficient for discharging the molten and entirely or partially evaporated rock sufficiently quickly by way of the peripheral gap of the dynamic pressure space and introducing it into the main conveying stream.

Furthermore, it is provided that the heat shield is cooled on its side facing away from the face of the cavity. In this way, it is ensured that the heat shield is cooled on its back side and, in particular, the parts of the advancing head that lie behind it are protected against overheating and destruction caused thereby.

It is practical if this cooling of the heat shield is carried out using a fluid cooling medium, which is provided in a sufficient amount in a pressure vessel assigned to the advancing head, and, if necessary, is kept cool by the supplied gaseous conveying medium, by means of suitable heat exchangers.

The gaseous conveying medium is preferably nitrogen. Nitrogen can be produced in particularly cost-advantageous manner and behaves in chemically inert manner, to a great extent. Of course, other inert gases or gas mixtures can also be used as a conveying medium, for example argon or other suitable noble gases.

In order to guarantee reliable removal transport of the molten and/or evaporated rock from the cavity, it is furthermore provided that such an amount of gaseous conveying medium is blown into the ring space between the wall of the cavity, on the one hand, and the advancing head or the advancing and supply device, on the other hand, that a flow velocity of more than 10 m/s, preferably more than 20 m/s is generated everywhere in this ring space. This speed is sufficient for reliably discharging the molten and/or evaporated rock out of the cavity, and for preventing it from collecting on the walls of the cavity, on the advancing head or on the advancing and supply device when it recombines or condenses.

It is practical if the plasma generators work at an electric power of 30 kW to 1000 kW, which is supplied by way of the supply device and is controlled in accordance with the heat requirement, outside of the cavity.

To stabilize the walls of the cavity, it is provided that the heated conveying medium that exits at the periphery of the dynamic pressure space starts to melt (vitrifies) the surrounding rock. The walls stabilized in this manner then might not have to be supported by means of timbering or piping.

Furthermore, an apparatus for carrying out the method explained above is an object of the invention, having an advancing head attached to an advancing and supply device, which head is provided with at least one electric plasma generator for melting and/or evaporating the bedrock situated at the face of the cavity, and with guide devices for a gaseous conveying medium, wherein this apparatus is characterized in that the advancing head has a heat shield at the front, which shield covers the face of the cavity except for a gap that remains at the periphery and forms a dynamic pressure space with the face of the cavity, which space is impacted by a partial stream of the gaseous conveying medium that is heated to the evaporation temperature of the rock, using electric plasma generators assigned to the heat shield, and discharges the molten and at least partially evaporated rock out of the dynamic pressure space, by way of the peripheral gap, and introduces it into the main stream of the gaseous conveying medium.

A first possible embodiment of the apparatus provides that the heat shield, as a compact block, consists of a material resistant to high temperatures, particularly of tantalum carbide, is provided at the front with a peripheral bead that encloses the pressure space, and contains multiple plasma generators in its volume, the heated plasma of which is guided into the dynamic pressure space enclosed by the bead and against the face of the cavity, by way of plasma channels disposed in the block. This embodiment of the heat shield has the particular advantage that the plasma generators are disposed in the interior of the heat shield, in protected manner, and do not come into direct contact with the molten and/or evaporated rock. Here, the partial stream of the gaseous conveying medium that carries the molten and evaporated rock away is formed by the plasma gas supplied by way of the plasma generators.

An alternative embodiment of the apparatus according to the invention provides that the heat shield, as a housing that is open toward the bottom, consists of a material resistant to high temperatures, particularly of tantalum carbide, the open front side of which housing lies against the face of the cavity, and the back wall of which housing is equipped with plasma generators, the plasma jet of which is directed directly onto the face of the cavity. Because here more gaseous conveying medium is required for filling the interior of the housing, a partial stream of the conveying medium is also blown into the dynamic pressure space, in addition to the gas supplied by the plasma burners.

In both embodiments of the heat shield discussed above, the heat shield is provided, on its back side, with a cooling device through which a cooling medium, for example water, flows.

Likewise, in order to prevent overheating, the electric plasma generators are cooled by the circulated cooling medium, for example water. The cooling medium circuit is in turn cooled by the freshly supplied conveying medium, by way of heat exchangers, if necessary.

A particularly preferred embodiment of the apparatus according to the invention provides that the supply device has a double-pipe linkage that consists of double-pipe sections that are screwed together, having an inner pipe composed of electrically conductive material and an outer pipe composed of electrically conductive material, which encloses the inner pipe at a distance and is electrically insulated relative to it, wherein the free cross-section of the inner pipe serves for supplying the partial stream of the conveying medium for plasma generation, the ring space between inner pipe and outer pipe serves for supplying the main stream of the conveying medium, and the electrically conductive cross-sections of the inner pipe and the outer pipe serve as electric conductors for the power supply and as data transmission conductors. A double-pipe linkage configured in this manner makes it possible, in simple manner, for the advancing and supply device to supply the advancing head with all the required media and with data.

In order to increase the intensity of the plasma acting at the face of the cavity, it is finally provided that additional anodes are disposed between two plasma generators, in each instance, which generators are disposed to be displaceable in the direction toward the face of the cavity. In this manner, it is possible to displace the plasma arcs of the plasma generators all the way to directly at the face of the cavity, and thereby the degree of effectiveness of the system can be significantly increased.

Figure 2:
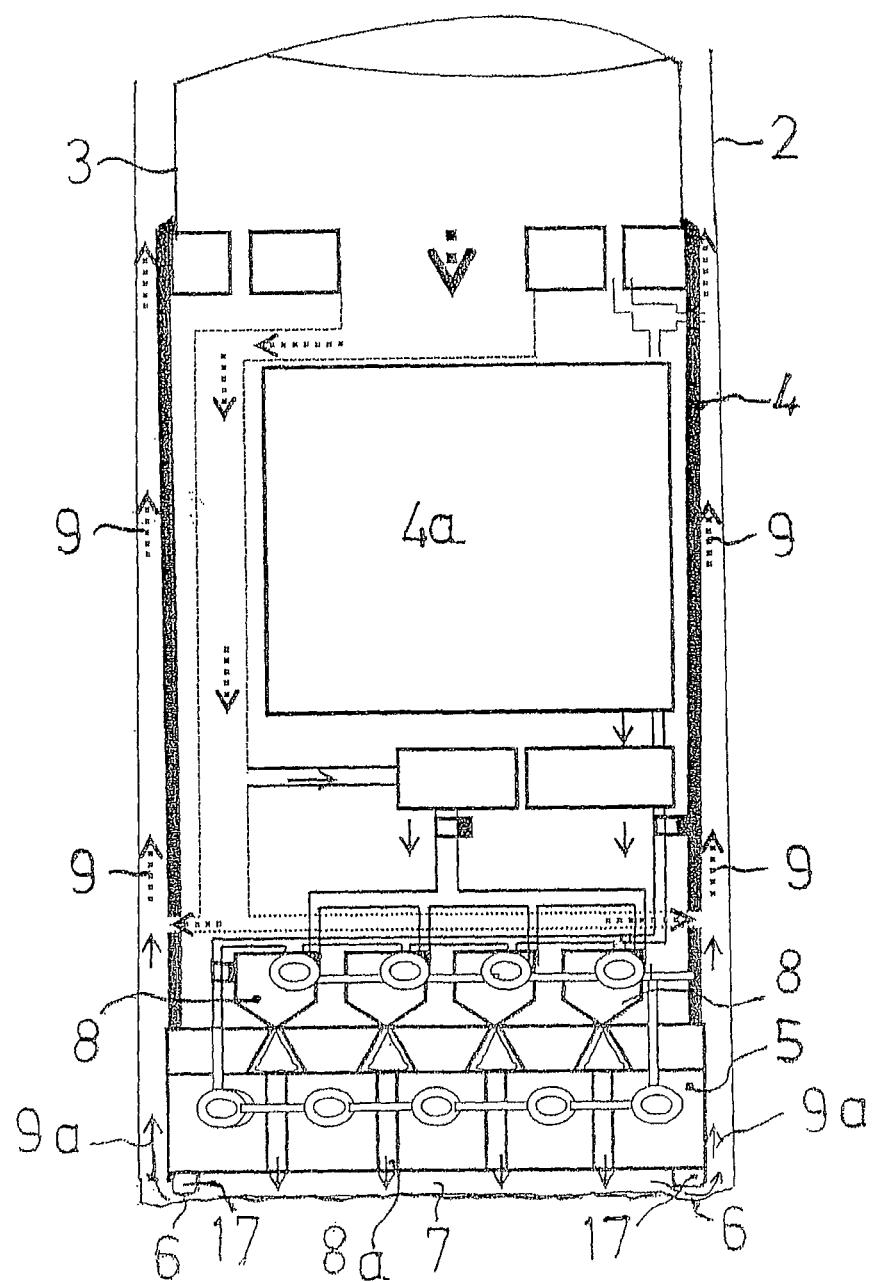
Figure 3:
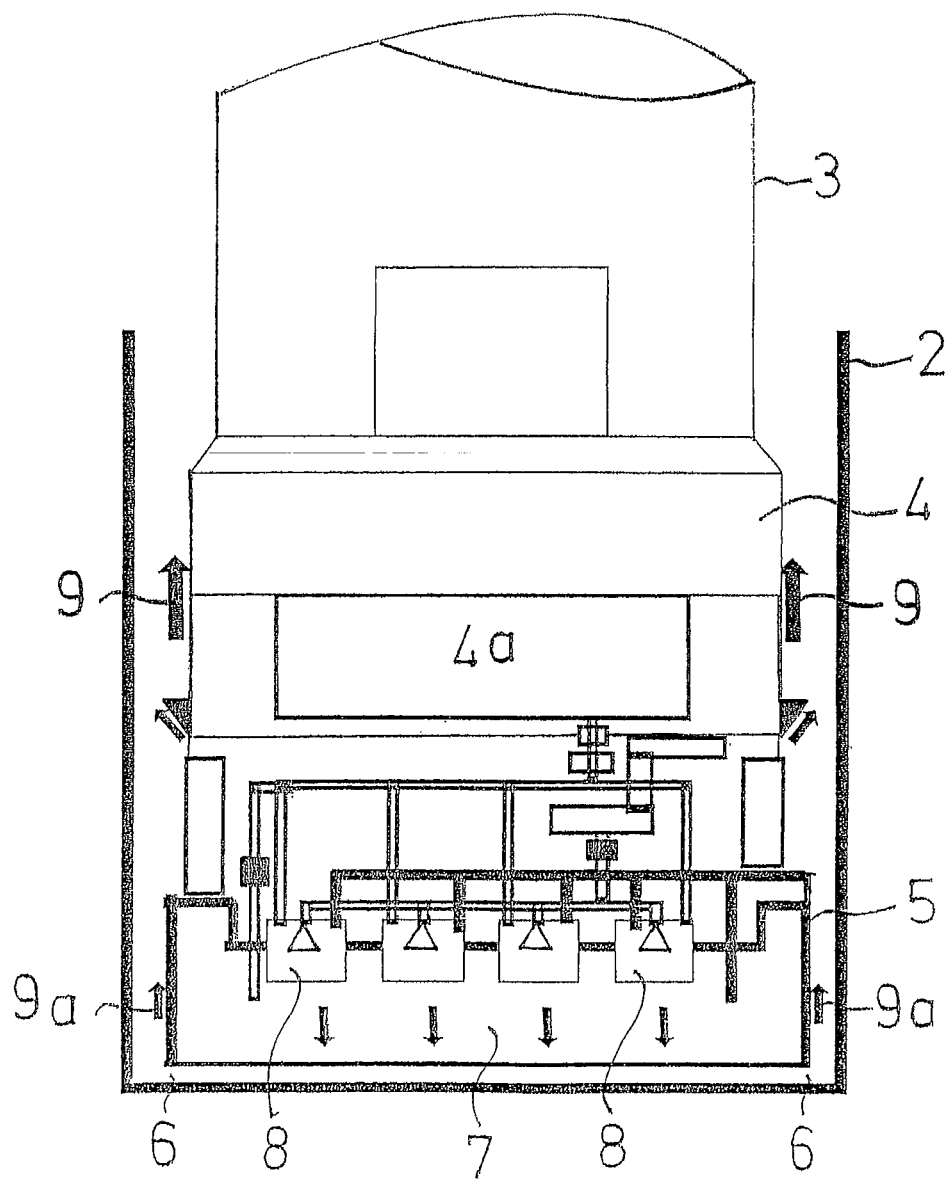
Figure 4:
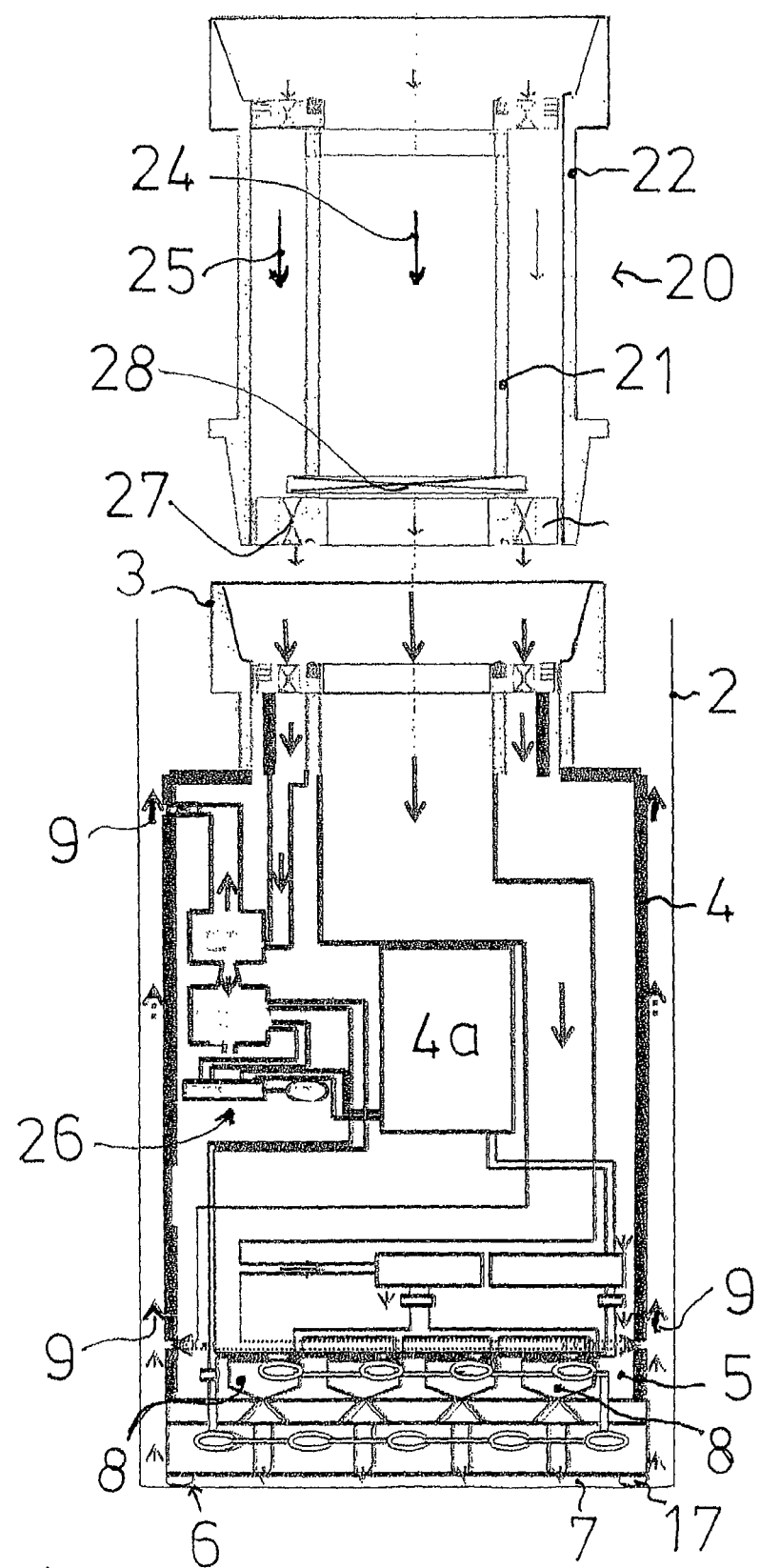
Figure 5:
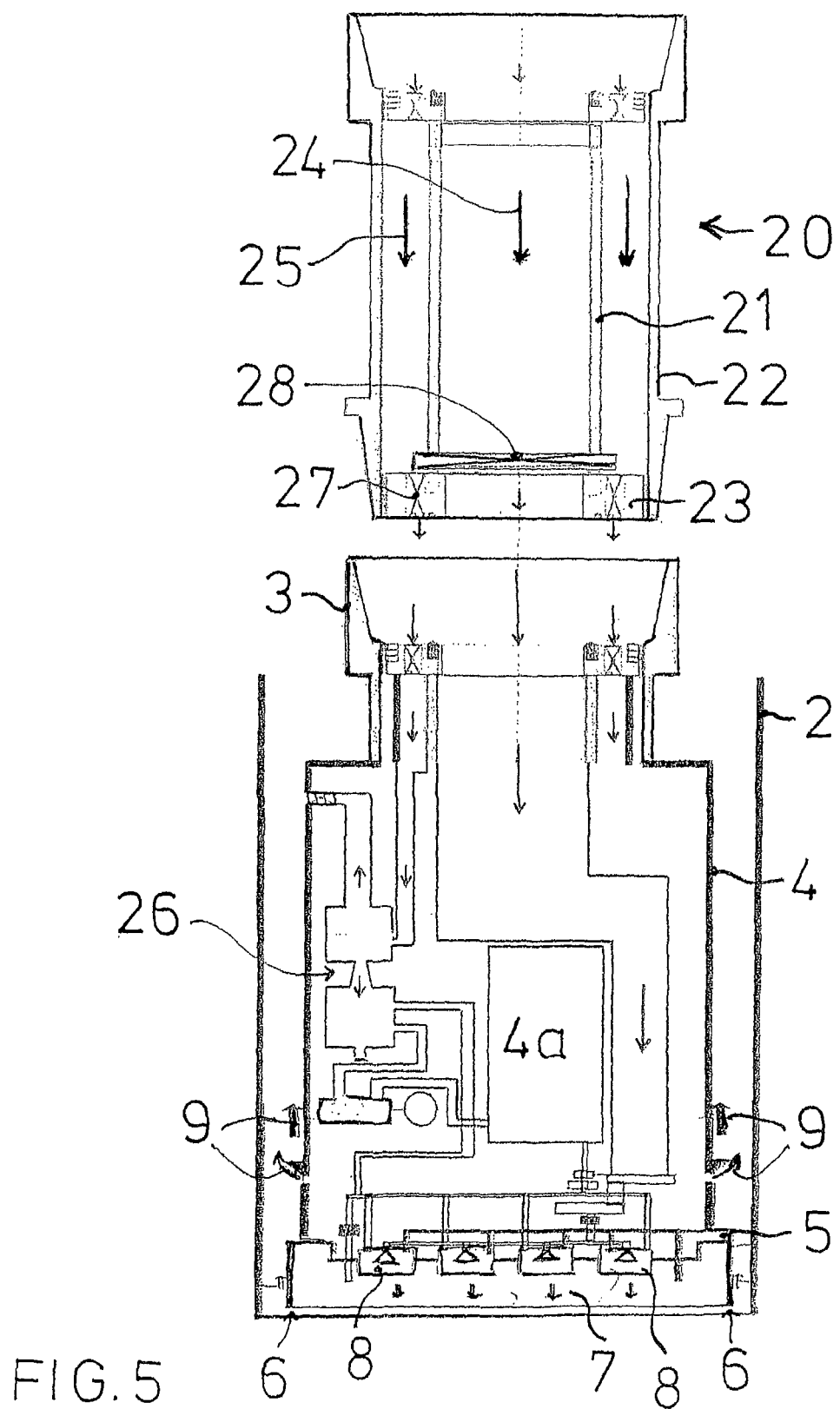
Figure 6:
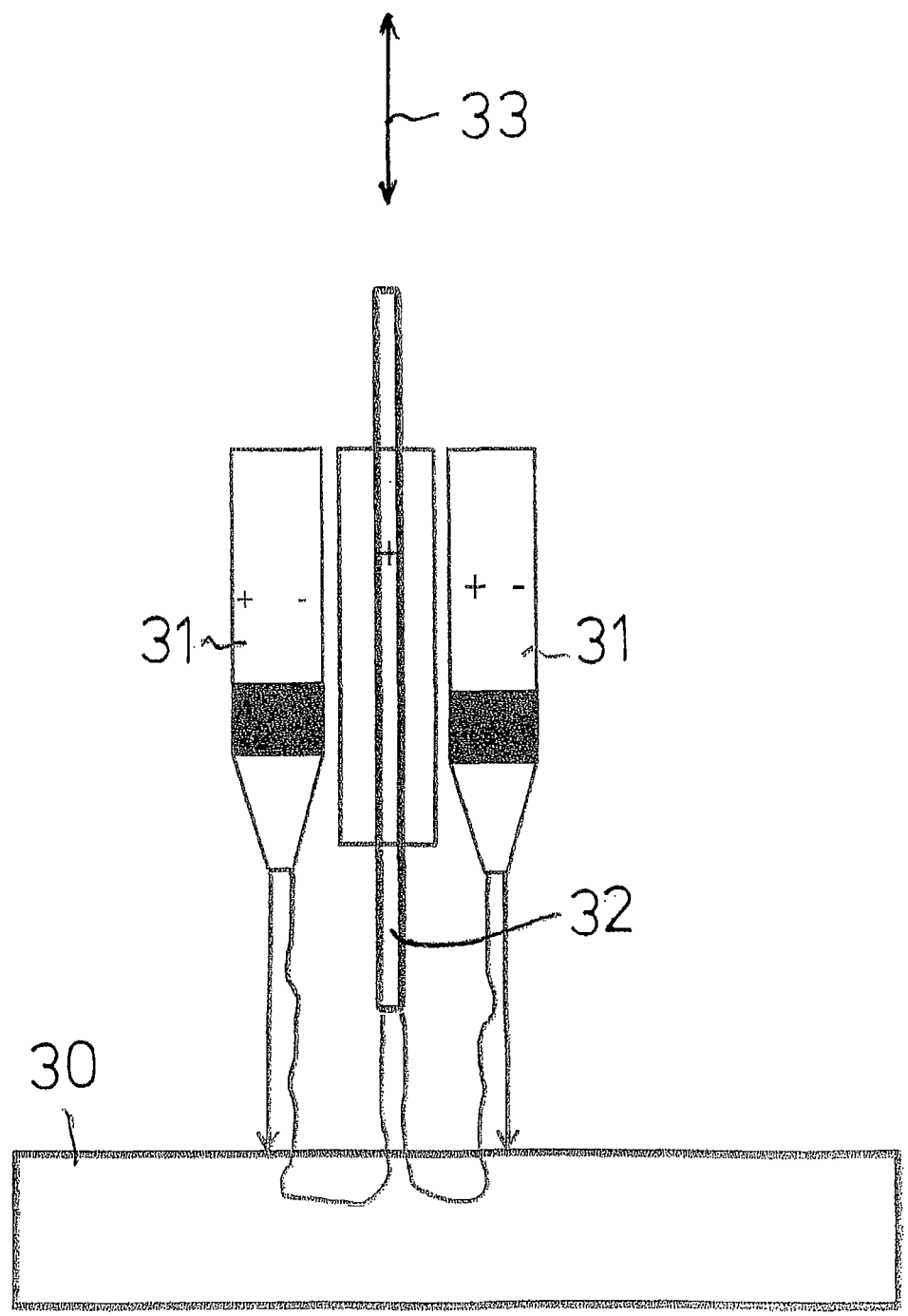

Exemplary embodiments of apparatuses according to the invention will be explained in greater detail below, using the drawings. These show:

FIG. 1: a schematic diagram of a sinking system according to the invention;

FIG. 2: an axial section through the advancing head and the heat shield in a first embodiment;

FIG. 3: an axial section through the advancing head and the heat shield in a second embodiment;

FIG. 4: an axial section through the advancing head, the heat shield, and the supply device in a third embodiment;

FIG. 5: an axial section through the advancing head, the heat shield, and the supply device in a fourth embodiment;

FIG. 6: schematically, the arrangement of a displaceable anode between two plasma generators.

In FIG. 1, a sinking framework set up above ground is indicated with the reference symbol 1. This sinking framework 1 is provided with the usual devices for introduction of an advancing and supply device 3, which serves for advancing and supplying an advancing head 4 disposed in the cavity 2 to be produced. The advancing head 4 is provided with a heat shield 5 on its side facing the face of the cavity 2, which shield covers the face of the cavity 2 except for a gap 6 that runs at the periphery and forms a dynamic pressure space 7 with the face of the cavity 2.

Multiple electric plasma generators 8 in the form of plasma burners are disposed in or on the heat shield 5; their heat causes the bedrock at the face of the cavity 2 to melt or evaporate.

The rock melted and/or evaporated at the face of the cavity 2 is discharged from the cavity 2 by means of a gaseous conveying medium indicated by arrows 9. This gaseous conveying medium 9 is nitrogen, is supplied by a compressor system 10, and is passed to the advancing head 4 by way of a linkage that serves as an advancing and supply device 3. The conveying medium 9, charged with the molten and/or evaporated rock, is discharged by way of the ring space between the cavity wall and the advancing and supply device 3, and separated from the rock in a separator apparatus 11.

The electric plasma generator 8 is supplied with electric energy by means of a direct-current generator 12 having an electric power of 30 kW to 1000 kW, by way of electric lines 13 and the advancing and supply device 3, which is provided with suitable electric transmission means.

The heat shield 5 is cooled with water on its back side, which water is kept on hand in a suitable water container 4a in the advancing head 4 or in a supply container 14 above ground, and supplied to the heat shield 5 by way of suitable lines and valves.

The plasma generators 8 are also cooled, from the back, with the same cooling medium, so that overheating phenomena are excluded there, as well.

The supply of conveying medium 9, electric power, and cooling medium is controlled by a computer 15 that stands in connection with the direct-current generator 12 and control valves for the conveying medium 9 and the nitrogen, by way of corresponding data lines 16.

In the exemplary embodiment of FIG. 2, the heat shield 5 consists of a compact block composed of extremely heat-resistant material, for example of tantalum carbide, and is provided with a circumferential bead 17 on its underside, which bead encloses the dynamic pressure space 7. Here, the plasma generators 8 are disposed in the body of the compact block composed of tantalum carbide, and are connected with the dynamic pressure space 7 by way of plasma channels 8a directed against the face of the cavity 2. The plasma gas (nitrogen) supplied by way of the plasma channels 8a simultaneously serves as a conveying medium for discharging the molten and/or evaporated rock from the dynamic pressure space 7, by way of the gap 6 remaining on the periphery of the dynamic pressure space 7, between the bead 17 and the face of the cavity 2. The partial stream 9a of the conveying medium 9 that passes through here simultaneously melts the walls of the cavity 2 in such a manner that they vitrify and are thereby stabilized. As a result, the walls of this cavity 2 do not need to be supported with timbering or piping, in a normal case.

Cooling of the back side of the block that serves as the heat shield 5 takes place by means of water that is kept on hand in the water container 4a in the advancing head 4. This water can be supplemented, from time to time, from the supply container 14 disposed above ground. Similar to the heat shield 5, the plasma burners 8 contained in the heat shield 5 are also cooled with water.

In the exemplary embodiment according to FIG. 3, the heat shield 5 consists of a housing that is open toward the front, composed of a highly heat-resistant material, particularly of tantalum carbide, the open front side of which lies against the face of the cavity 2, and the back wall of which is equipped with plasma generators 8, the plasma jets of which are directed directly against the face of the cavity 2. Here, the dynamic pressure space 7 is formed by the interior of the housing.

Here, too—just as in the exemplary embodiment according to FIG. 3—the bedrock situated at the face of the cavity 2 is melted and at least partially evaporated, discharged by means of a partial stream 9a of the conveying medium 9, by way of the gap 6 situated at the periphery of the dynamic pressure space 7, and introduced into the main stream of the conveying medium 9. In this connection, the walls of the cavity 2 are also partially melted and stabilized in this manner.

Finally, here, too, the plasma generators 8 and the heat shield 5 are cooled with water from the back side of the heat shield 5, which water is kept on hand in the water container 4a.

The apparatus shown in FIG. 4 corresponds, to the greatest possible extent, to the apparatus according to FIG. 2, so that it was possible to use the same reference numbers for the parts that correspond to one another.

In addition, details of the advancing and supply device, in particular, are shown in FIG. 4. The advancing and supply device has a double-pipe linkage that consists of a plurality of pipe sections 20 that are screwed together. Each pipe section 20 has a metallic inner pipe 21 and a metallic outer pipe 22, which surrounds the inner pipe 21 at a distance. The inner pipe 21 and the outer pipe 22 are electrically insulated from one another by means of insulation sleeves 23, so that they can be used as the metallic current conductor that supplies the advancing head with electric energy. At the same time, the two pipes, which are insulated from one another, can be used as electric conductors for data transmission.

The free cross-section of the inner pipe 21 serves as a supply channel for the partial stream 24 of the conveying medium guided through the plasma generator 8. In contrast, the partial stream 25 of the conveying gas that serves for conveying away the molten and evaporated rock is guided through the ring space between the inner pipe 21 and the outer pipe 22. A partial stream is branched off from this partial stream 25, within the advancing head 4, and this stream is passed through heat exchangers 26 with which the cooling water in the cooling water container 4a and the related cooling circuit is kept cool. For this purpose, it can be practical to pre-cool the partial stream 25 before it is introduced into the ring space, for example in that additional liquid nitrogen is introduced. The partial streams 24 and 25 can be controlled by valves 27 and 28 situated at the ends of the pipe sections, if necessary.

The apparatus shown in FIG. 5 corresponds, to the greatest possible extent, to the apparatus according to FIG. 3, so that here, too, it was possible to use the same reference numbers for the parts that correspond to one another.

In addition, in FIG. 5 the details of the advancing and supply device are shown; these have fundamentally the same structure as has been shown and explained using FIG. 4. In this regard, as well, reference can be made to the above explanations.

Finally, FIG. 6 shows a special arrangement of two plasma generators 31 above a rock face 30 to be melted. These two plasma generators 31 have a displaceable anode assigned to them, which, as has been indicated with the double arrows 33, can be set, in targeted manner, to a close distance from the rock face 30. In this way, two very intensively acting arcs occur between the plasma generators 31 and this anode 32, which arcs can significantly accelerate the melting and evaporation of the rock face 30, because the arcs are situated close to this rock face 30.

The special arrangement of the plasma generators and of the displaceable anode shown in FIG. 6 can be used in all the embodiments of the advancing head described above.

The invention claimed is:

1. An apparatus for introducing or sinking cavities in rock, in which bedrock situated at a face of the cavity is thermally melted and is conveyed out of the cavity using a gaseous conveying medium, the apparatus comprising:
    an advancing and supply device configured to be pushed into the cavity, said device having an advancing head at its front end, and
    a fixed heat shield disposed at a front of the advancing head, wherein the heat shield
        is cooled on its back, facing away from the face of the cavity,
        is provided on a front thereof with one or more electric plasma burners, facing the face of the cavity, said electric plasma burners providing heat required for melting the rock, is adapted to cover the face of the cavity except for a gap that runs along a periphery of the cavity, and is adapted to form a dynamic pressure space with the face of the cavity, said dynamic pressure space being impacted by plasma gas of the plasma burner(s), and is free of movable parts.

2. The apparatus according to claim 1, wherein the heat shield is formed as a compact block consisting of a material that melts at a high temperature, and has a peripheral bead on a front of the bock that encloses the dynamic pressure space, and contains the plasma generators in its volume, and wherein plasma channels are disposed in the compact block, said plasma channel being adapted to guide heated plasma from said generators into the dynamic pressure space enclosed by the bead and against the face of the cavity.

3. The apparatus according to claim 1, wherein the heat shield is formed as a housing that is open on a front side thereof, said housing being composed of a material resistant to high temperatures, wherein the open front side of said housing lies against the face of the cavity, and a back wall of said housing is equipped with said plasma generators, plasma jets of which are directed directly onto the face of the cavity.

4. A method for introducing or sinking cavities in rock, in which rock situated at a face of the cavity is thermally melted, the method comprising the following steps:

introducing an advancing and supply device into the cavity, said device having an advancing head at its front end, and a fixed heat shield disposed at a front of the advancing head, wherein the heat shield is provided with one or more electric plasma burners at its front, facing the face of the cavity, the plasma burners supplying heat to melt the rock at the face of the cavity, wherein the heat shield covers the face of the cavity except for a gap that runs along its periphery, supplying plasma gas to the plasma burners to melt the rock at the face of the cavity and to form a dynamic pressure space between the heat shield and the face of the cavity, said dynamic pressure space being free of movable parts, and conveying the melted rock out of the cavity using a gaseous conveying medium, wherein a dynamic pressure of more than 2 bar and a temperature of more than 2900° C., are set in the dynamic pressure space between the heat shield and the face of the cavity.

5. The method according to claim 4, wherein nitrogen is used as the plasma gas and as the gaseous conveying medium.

6. The method according to claim 4, wherein the gaseous conveying medium is blown into a ring space between the wall of the cavity and the advancing head or its advancing and supply device in such a quantity that a flow velocity of more than 10 m/sec. is generated everywhere in said ring space.

7. The method according to claim 4, wherein the plasma generators work at an electric power of 30 kW to 1000 kW, which is supplied by way of the advancing and supply device and is controlled in accordance with heat requirements, outside of the cavity.

8. The method according to claim 4, wherein the gaseous conveying medium is introduced into the dynamic pressure space such that the gaseous conveying medium that exits at a periphery of the dynamic pressure space starts to melt the surrounding bedrock, and in this way stabilizes walls of the cavity.

* * * * *